March 31, 1964 B. YOUNG ETAL 3,126,869
SCENT BREAKING UNIT
Filed July 2, 1963
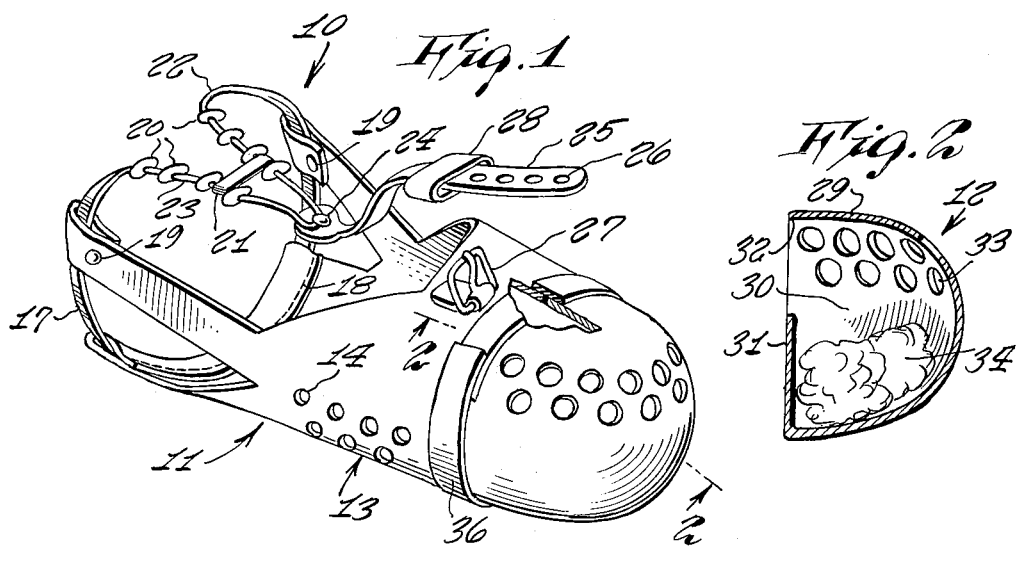
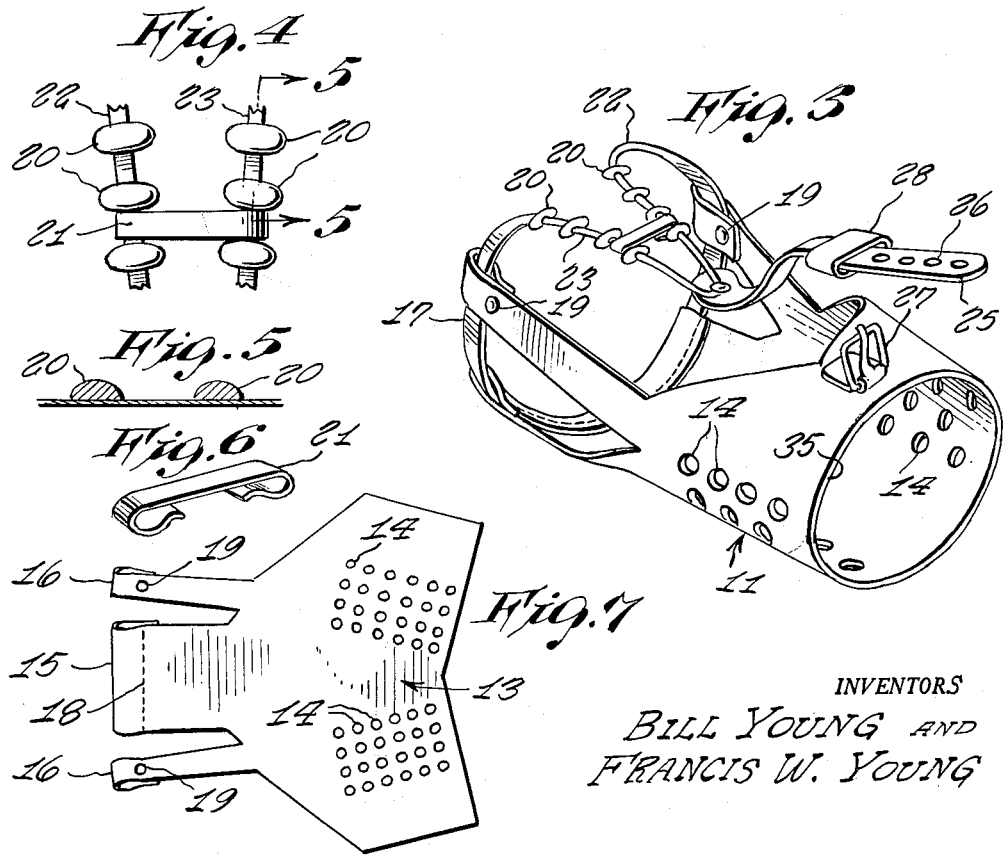
INVENTORS
BILL YOUNG AND
FRANCIS W. YOUNG

United States Patent Office 3,126,869
Patented Mar. 31, 1964

3,126,869
SCENT BREAKING UNIT
Bill Young and Francis W. Young, both of 5602 Persimmon Ave., Temple City, Calif.
Filed July 2, 1963, Ser. No. 293,572
4 Claims. (Cl. 119—29.5)

This invention relates generally to dog muzzles. More specifically it relates to dog muzzles that are adaptable for incorporating a scent breaking unit.

It is generally well known to those skilled in the art that it is a long and tedious job to train a dog for hunting. There are many thousands of hunters, all of whom use some breed of trail hound in hunting coon, cats, bear and other game. All these dogs are known as "trail dogs" since they follow an animal by scent alone. If an untrained hound is taken hunting, it does not know what type of game it is supposed to trail, and as a result it trails any game that makes a track, be it skunk, opossum, deer, fox, coyote, rabbit, mink or the like. It is an arduous task to teach a dog and prevent its running off game, other than coon, cat or bear. In view of this, many hunters hunt a young dog together with an older dog that is already broke and will not run off game. The young dog is scolded and punished every time, if possible, whenever he opens or barks on a trail where the trained dog will not bark. The hunter, knowing the older dog is broke will thus recognize when a young dog is running off game, if the older dog will not work the same trail. In this manner of breaking or training a dog the task may require several years for an average hunter and even then many dogs are never completely trained. Accordingly, it is a principal object of the present invention to provide a scent breaking unit and muzzle wherein the muzzle is adaptable for incorporating therewith a scent pocket for receiving therein commercially available scent of the type of animal which the hunter does not wish his dog to run. This unit is adaptable to be comfortably worn by the dog over relatively long periods of time in order that the animal will thoroughly tire of the scent after a few days, and then when taken to hunt, he will lose all desire for that particular trail or scent when the scent is crossed in the hunting area. This unit can be used over and over with various other scents of undesirable animals which are generally termed "trash" until the dog has nothing left to work but the tracks of desired game.

Another object of the present invention is to provide a scent breaking unit and muzzle wherein the muzzle is of relatively light weight.

Another object of the present invention is to provide a scent breaking unit and muzzle wherein the scent pocket is readily removable for thorough cleaning so that it may be used for a different scent of another animal.

Still another object of the present invention is to provide a scent breaking unit and muzzle wherein the scent pocket is readily attached to the muzzle and wherein the scent may be easily poured into the scent pocket.

Other objects of the invention are to provide a scent breaking unit and muzzle bearing the above objects in mind which is of simple construction, has a minimum number of parts, is inexpensive to manufacture and efficient in operation and use.

For other objects and for a better understanding of the invention reference may be had to the following detailed description taken in conjunction with the accompanying drawing, in which:

FIGURE 1 is a perspective view of the scent breaking unit and muzzle integrally attached;

FIG. 2 is a cross sectional view through lines 2—2 of FIG. 1 showing the scent pocket element per se;

FIG. 3 is a perspective view of the muzzle element per se;

FIG. 4 is a fragmentary enlarged elevational view of the dog head strap;

FIG. 5 is an enlarged cross sectional view through lines 5—5 of FIG. 4;

FIG. 6 is a perspective view of a catch element associated with the hog head strap; and FIG. 7 is a pattern view of the muzzle element prior to folding and the final step in manufacture.

Referring now to the drawing in detail, the numeral 10 represents a scent breaking unit and muzzle according to the present invention wherein there is a muzzle element 11 and a scent pocket element 12 of soft plastic or the like. The muzzle element 11 includes a nose portion or snoot portion 13 which folds over the dog's nose and which includes a plurality of ventilation openings 13' therethrough. Incorporated therewith is a rearwardly extending neck tab 15 adjacent each side thereof is a side tab 16. These tabs are folded over a flat strap 17 forming a dog neck collar and are stitched or riveted, as shown at 18 and 19 respectively. The upper ends of the strap 17 are designed to pass around a dog's ears and forwardly therebetween. A plurality of hemispherical beads 20 are affixed in spaced apart relation on the upper sides of the strap 17 and a catch 21 made of flexible material is selectively secured between the beads to each side 22 and 23 of the strap 17, thereby securing maximum comfortable adjustment on the dog's head. Each side 22 and 23 of the strap 17 terminates at a common end where they are riveted by means of rivet 24 to a belt 25. The opposite end of the belt has a plurality of openings 26 therein, each of which may be selectively engaged with a buckle 27 affixed to the upper side of the snoot portion 13. A plastic loop 28 serves as a keeper over the buckle and belt when the two are in hooked engagement, thereby securely keeping the parts from becoming disengaged.

The scent pocket is of generally hemispherical configuration having a hemispherical outer wall 29 enclosing a central compartment 30 therewithin and having a low wall 31 on one side and an opening 32 adjacent the low wall. A plurality of small openings 33 are made in the hemispherical wall which serve as air vents. The low wall 31 forms a leakproof pocket between it and the hemispherical wall within which pocket a wad of cotton 34 may be placed. It is to be noted that the forward end of the snoot portion of the muzzle has a circular opening 35 which is in communication with the opening 32 of the scent pocket when the two elements are brought into engagement with each other. When thus brought into engagement the two elements can be securely fastened by means of a tape 36 which extends around the forward periphery of the muzzle and the rearward periphery of the scent pocket, as shown in FIG. 1 of the drawing.

In operative use, liquid scent may be poured upon the cotton, the scent pocket attached to the muzzle and the muzzle attached to the dog's head. Each side 22 and 23 of the strap passes around the dog's ears and the belt 25 is secured to the buckle 27 with the loop 28 securing the belt and buckle.

Thus, there has been provided a scent breaking unit and muzzle which will shorten the time to break a dog from running trash.

While various changes may be made in the detail construction, it shall be understood that such changes shall be within the spirit and scope of the present invention as defined by the appended claims.

What we claim as new and desire to protect by Letters Patent of the United States is:

1. In a scent breaking device the combination of a muzzle element and a scent pocket element, means for attaching said muzzle element to a dog's head, means for placing liquid scent into said scent pocket and means for attaching said scent pocket to said muzzle element.

2. In a scent breaking device the combination as set forth in claim 1 wherein said scent pocket element comprises a hemisprecial member having an outer wall enclosing a central area, a plurality of openings in said outer wall, a low rear wall and an opening adjacent said rear wall.

3. In a scent breaking device the combination as set forth in claim 2 wherein said muzzle element comprises a generally cylindrical snoot portion, a plurality of vent openings in the sides of said snoot portion, an enlarged opening in the forward end of said snoot portion, said opening being adjacent said rear opening of said scent pocket element when said elements are in engagement with each other, rearwardly extending tabs adjacent said snoot portion, said tabs engaging a strap, a plurality of hemispherical beads on the upper side of said strap, a catch collectively engaged between said beads and a belt attached to said strap, said belt being engageable with a buckle affixed to the upper side of said snoot portion.

4. In a scent breaking device the combination as set forth in claim 3 wherein said muzzle element and said scent pocket element are engageable together by a tape around the forward periphery of said muzzle element and the rearward periphery of said scent pocket element.

References Cited in the file of this patent

UNITED STATES PATENTS

| | | |
|---|---|---|
| 522,696 | Sandborn | July 10, 1894 |
| 1,300,985 | Mandelbaum | Apr. 15, 1919 |
| 2,658,478 | Jones | Nov. 10, 1953 |
| 2,851,991 | Rinck | Sept. 16, 1958 |
| 2,959,354 | Beck | Nov. 8, 1960 |